United States Patent
Koda

(10) Patent No.: US 9,761,966 B2
(45) Date of Patent: Sep. 12, 2017

(54) MOLD FOR FORMING TERMINAL OF ELECTRIC WIRE

(71) Applicant: Yazaki Corporation, Minato-ku, Tokyo (JP)

(72) Inventor: Yoshitaka Koda, Kakegawa (JP)

(73) Assignee: YAZAKI CORPORATION, Tokyo (JP)

(*) Notice: Subject to any disclaimer, the term of this patent is extended or adjusted under 35 U.S.C. 154(b) by 61 days.

(21) Appl. No.: 15/067,441

(22) Filed: Mar. 11, 2016

(65) Prior Publication Data

US 2016/0268755 A1  Sep. 15, 2016

(30) Foreign Application Priority Data

Mar. 12, 2015  (JP) .................... 2015-049542

(51) Int. Cl.
| | |
|---|---|
| *H01R 11/12* | (2006.01) |
| *H02G 1/14* | (2006.01) |
| *H02G 15/02* | (2006.01) |
| *H01B 7/00* | (2006.01) |
| *H01R 43/28* | (2006.01) |

(52) U.S. Cl.
CPC ............. *H01R 11/12* (2013.01); *H01B 7/00* (2013.01); *H01R 43/28* (2013.01); *H02G 1/14* (2013.01); *H02G 15/02* (2013.01)

(58) Field of Classification Search
CPC .......... H01R 11/12; H01R 43/28; H01B 7/00; H02G 1/14; H02G 15/02
USPC ................................................ 72/342.96
See application file for complete search history.

(56) References Cited

U.S. PATENT DOCUMENTS

| | | | |
|---|---|---|---|
| 5,025,554 A * | 6/1991 | Dohi ................. | H01R 4/187 174/94 R |
| 5,191,710 A | 3/1993 | Fujimaki et al. | |
| 9,590,324 B2 * | 3/2017 | Koda ................. | H01B 7/00 |

FOREIGN PATENT DOCUMENTS

| | | |
|---|---|---|
| JP | 4-249875 A | 9/1992 |
| JP | 2002-336968 A | 11/2002 |
| JP | 2014-220887 A | 11/2014 |

OTHER PUBLICATIONS

Office Action dated Feb. 7, 2017 issued by Japanese Intellectual Property Office in counterpart Japanese Patent Application No. 2015-049542.

\* cited by examiner

*Primary Examiner* — David B Jones
(74) *Attorney, Agent, or Firm* — Sughrue Mion, PLLC

(57) ABSTRACT

A mold includes a first electrode on which a looped conductor of an electric wire is placed, the looped conductor being an exposed conductor of the electric wire from which a coating is removed and having an overlap portion at which different parts of the exposed conductor overlap each other, a hole forming jig provided upright on the first electrode to extend through an inner hole of the looped conductor, a wire holding jig arranged to surround the first electrode, and a second electrode having a conductor pressing protrusion configured to be fitted in a conductor molding groove defined by the first electrode and the wire holding jig to press and heat the looped conductor. The wire holding jig has a plurality of separable holding jigs configured to hold the looped conductor between the separable holding jigs from a direction perpendicular to an axis of the hole forming jig.

3 Claims, 8 Drawing Sheets

MOLD FOR FORMING TERMINAL OF ELECTRIC WIRE

CROSS-REFERENCE TO RELATED APPLICATIONS

The present application claims priority from Japanese Patent Application No. 2015-049542 filed on Mar. 12, 2015, the entire content of which is incorporated herein by reference.

FIELD OF INVENTION

The present invention relates to a mold for forming a terminal of an electric wire.

RELATED ART

According to a related art, a wire terminal is provided by molding conductor wires of an electric wire using a pair of electrodes (see, e.g., JPH04-249875A).

As shown FIG. 8A, the pair of electrodes 501 has a female pressing electrode 503 and a male pressing electrode 505. The female pressing electrode 503 has a wire accommodating groove 511 including an annular groove 507 and a straight groove 509. In the center of the wire accommodating groove 511, a wire bending guide pin 513 is provided upright in an integral manner. The male pressing electrode 505 has a wire pressing protrusion 519 having a round portion 515 and a key-shaped portion 517. In the center of the round portion 515, an insertion hole 521 for the guide pin 513 is provided. The wire pressing protrusion 519 is fitted in the wire accommodating groove 511 with a gap provided therebetween.

As shown in FIG. 8B, conductor wires 525 of an electric wire 523 are set in the wire accommodating groove 511 of the female pressing electrode 503, and the conductor wires 525 are pressed by the wire pressing protrusion 519 of the male pressing electrode 505 while at the same time, current is applied to the female pressing electrode 503 and the male pressing electrode 505 to heat the conductor wires 525. In this way, a terminal-formed electric wire 529 having a solid ring terminal portion 527 as shown in FIG. 8C is provided.

In a case in which the conductor wires 525 of the electric wire 523 are made of aluminum or aluminum alloy, the molten conductor easily adheres to the wire accommodating groove 511 of the female pressing electrode 503 made of copper alloy for example, so that it is difficult to remove the molded article that is stuck to the wire accommodating groove 511. If the molded article adhered to the wire accommodating groove 511 is forcibly removed, breakage or the like can occur.

The conductor wires 525 accommodated in the wire accommodating groove 511 are bent in a ring shape to form a looped conductor. A distal end part and a base part of the conductor wires 525 are placed to overlap each other so that the looped conductor is in a form of a closed loop. This is because if the loop is open, the molten conductor is not sufficiently distributed over the terminal forming region and a shrinkage cavity or an external shrinkage depression can be formed in the molded article. However, the round portion 515 and the key-shaped portion 517 can be flat surfaces that are flush with each other. In such as case, when pressing the conductor wires 525, the wire pressing protrusion 519 first abuts on the highest point on the bulky overlap portion of the conductor wires 525. As a result, the Joule heat generation amount becomes non-uniform, and the overlap portion melts faster at the highest point than the other parts of the overlap portion. Such differences in melting timings cause an unevenness in melting and can result in shrinkage defects that deteriorate the molding quality of the terminal-formed electric wire 529.

SUMMARY

Illustrative aspects of the present invention provide a mold capable of pressing and heating a looped conductor to mold a ring terminal portion in a favorable manner.

According to an illustrative aspect of the present invention, a mold is provided to form a terminal of an electric wire. The mold includes a first electrode on which a looped conductor of the electric wire is placed, the looped conductor being an exposed conductor of the electric wire from which a coating of the electric wire is removed and having an overlap portion at which different parts of the exposed conductor are placed to overlap each other, a hole forming jig provided upright on the first electrode to extend through an inner hole of the looped conductor placed on the first electrode, a wire holding jig arranged to surround the first electrode, and a second electrode having a conductor pressing protrusion configured to be fitted in a conductor molding groove defined by the first electrode and the wire holding jig to press and heat the looped conductor between the first electrode and the second electrode. The wire holding jig has a plurality of separable holding jigs configured to hold the looped conductor of the electric wire and the hole forming jig between the separable holding jigs from a direction perpendicular to an axis of the hole forming jig.

At least one of the first electrode and the second electrode may have a contacting and pressing surface configured to conform to a shape of the overlap portion of the looped conductor. For example, each of the first electrode and the second electrode may have the contacting and pressing surface.

Other aspects and advantages of the invention will be apparent from the following description, the drawings and the claims.

DETAILED DESCRIPTION

Hereinafter, exemplary embodiments of the present invention will be described in detail with reference to the drawings.

Figure 1:
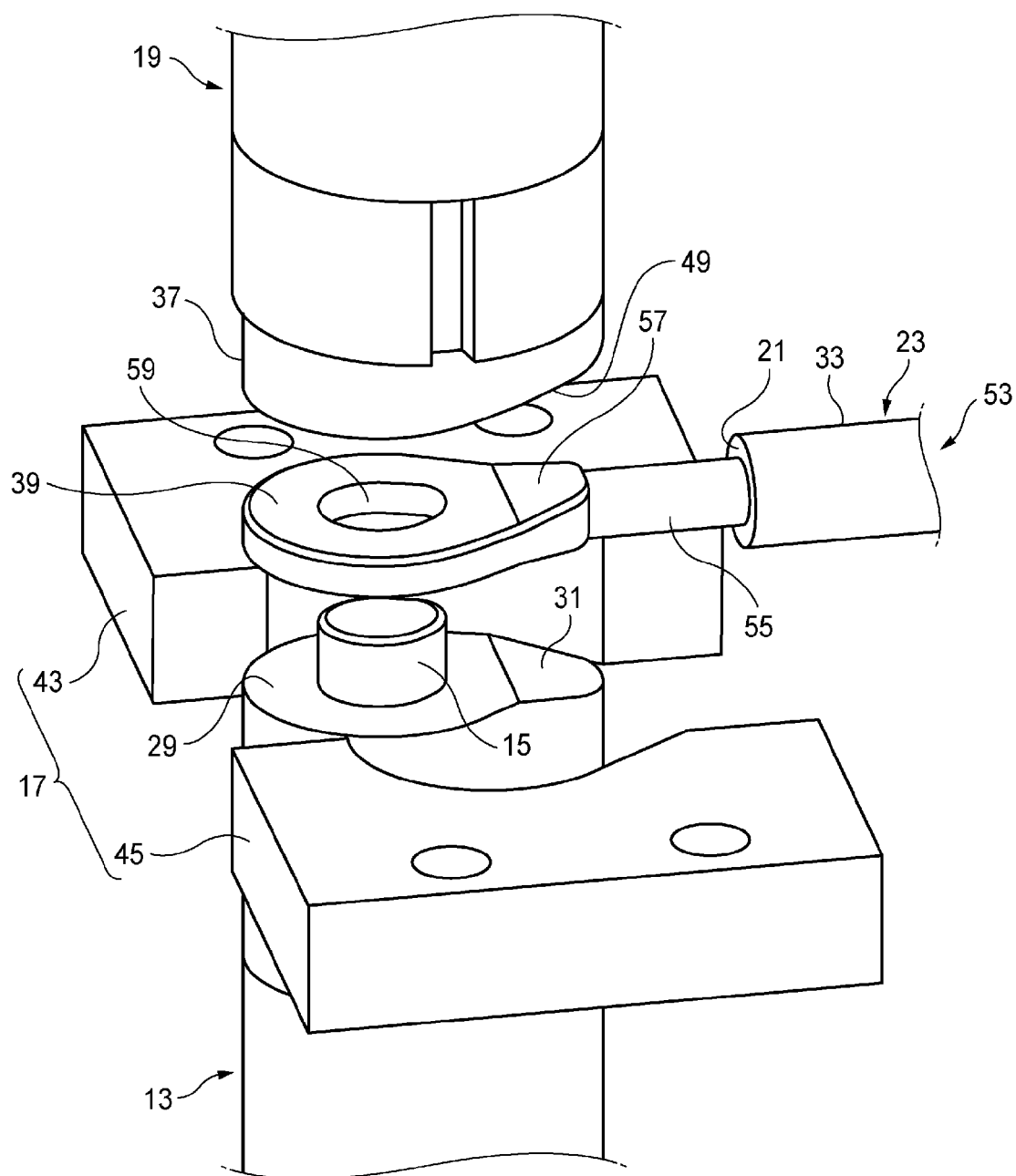
FIG. 1 is a perspective view of a mold according to an exemplary embodiment of the present invention, illustrating a state in which a wire holding jig of the mold is opened after forming a terminal of an electric wire.

As shown in FIG. 1, a mold 11 according to an exemplary embodiment of the present invention has a stationary electrode 13 (a first electrode), a hole forming jig 15 provided upright on the stationary electrode 13, a wire holding jig 17 arranged to surround the stationary electrode 13, and a movable electrode 19 (a second electrode) disposed above the stationary electrode 13 so as to face the stationary electrode 13. The stationary electrode 13 has a contacting and pressing surface 31, and the movable electrode 19 has a contacting and pressing surface 49.

A looped conductor 25 of an electric wire 23 is placed on the stationary electrode 13. The looped conductor 25 is an exposed conductor of the electric wire 23 from which a coating 21 of the electric wire 23 is removed, and has an overlap portion 51 at which a distal end part of the exposed conductor 55 is arranged on top of a base part of the exposed conductor 55 such that the distal end part and the base part of the exposed conductor 55 overlap each other. The stationary electrode 13 is fixed, for example, to a base (not shown) of the mold 11.

The hole forming jig 15 is provided upright on the stationary electrode 13 to extend through an inner hole 27 of the looped conductor 25 placed on the stationary electrode 13. In the present exemplary embodiment, the hole forming jig 15 is formed as a separate piece from the stationary electrode 13. However, the stationary electrode 13 and the hole forming jig 15 may be formed as a one-piece structure. The hole forming jig 15 may be configured to move downward toward the bottom side of the stationary electrode 13 together with the upward movement of the movable electrode 19 after the molding of the looped conductor 25.

The upper surface of the stationary electrode 13 has a ring-shaped molding surface 29. The contacting and pressing surface 31 is provided to extend contiguously from the ring-shaped molding surface 29 and to conform to a shape of the overlap portion 51 of the looped conductor 25 (see FIG. 4). The contacting and pressing surface 31 is formed as a slanting surface gradually separating from the looped conductor 25 toward a coated wire portion 33.

Figure 2:
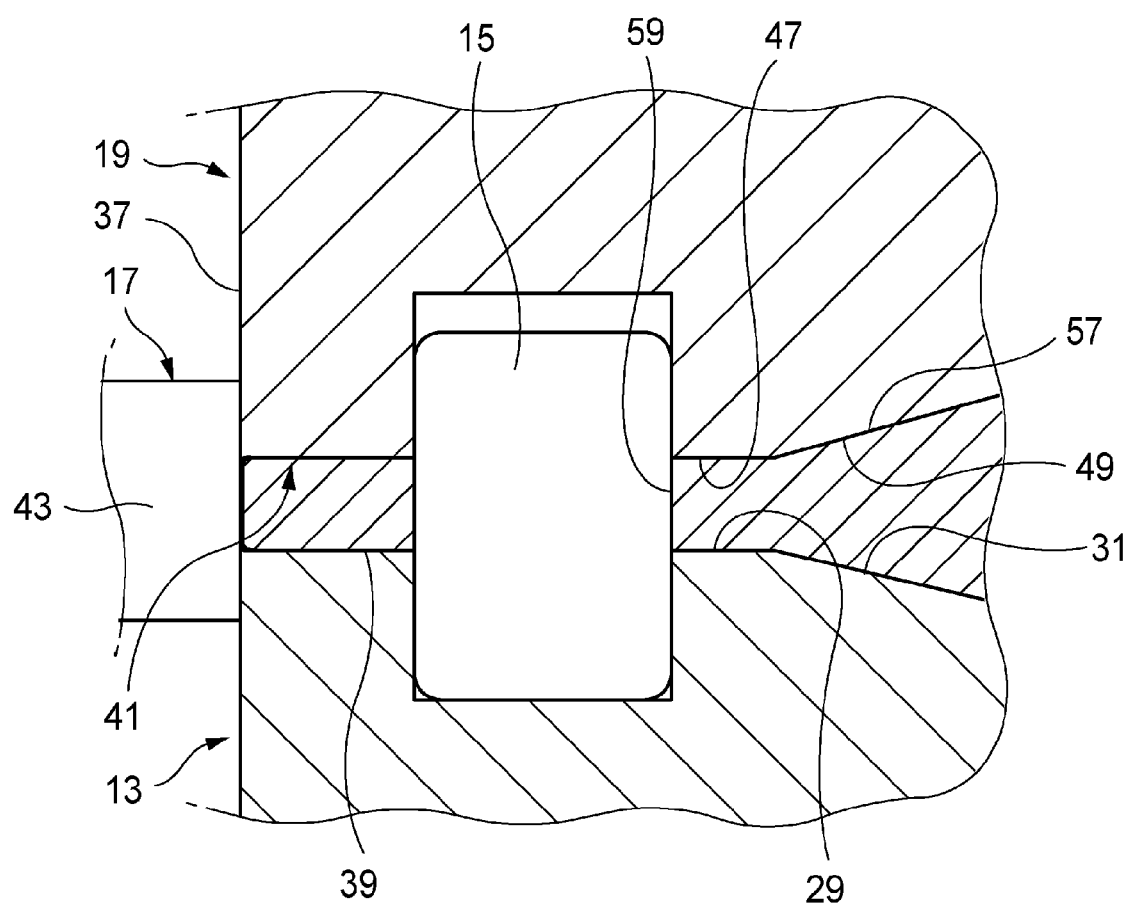
FIG. 2 is a cross-sectional view of a portion of the mold shown in FIG. 1, illustrating a state in which the terminal of the electric wire has been molded.
Figure 3:
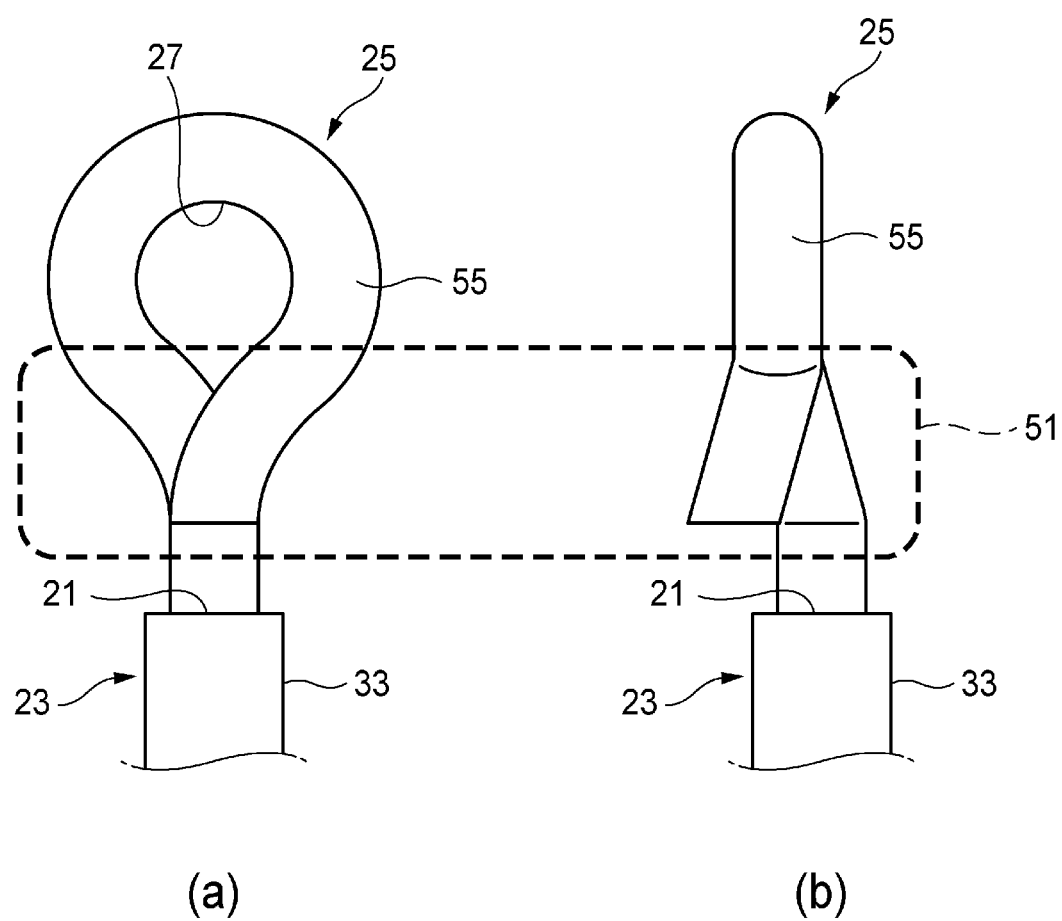
FIG. 3 illustrates a looped conductor before molding in (a) a plan view and (b) a side view.

The wire holding jig 17 is arranged to surround the stationary electrode 13. The wire holding jig 17, together with the stationary electrode 13 disposed on a lower side, defines a conductor molding groove 35 that is opened upward (see FIG. 6). In this conductor molding groove 35, a conductor pressing protrusion 37 of the movable electrode 19 is fitted. The conductor molding groove 35 and the conductor pressing protrusion 37 form, when fitted to each other, a cavity 41 for molding a ring terminal portion 39 (see FIG. 2). The cavity 41 has a certain volume when the movable electrode 19 is moved downward and stopped at a predetermined position at the conductor molding groove 35. The ring terminal portion 39 is a molded portion that is provided after molding the looped conductor 25.

The wire holding jig 17 has a pair of separable holding jigs 43, 45, the first holding jig 43 and the second holding jig 45 (an example of a plurality of separable holding jigs), configured to hold the looped conductor 25 of the electric wire 23 and the hole forming jig 15 from a direction perpendicular to the axis of the hole forming jig 15. It is desirable that the first holding jig 43 and the second holding jig 45 be made of a material (e.g., ceramic, titanium, or an alloy containing titanium) that does not easily adhere to aluminum or aluminum alloy, so that they can easily be separated from the ring terminal portion 39 formed by the conductor 55 made of aluminum or aluminum alloy. The wire holding jig may be divided into three or more separable holding jigs.

The movable electrode 19 has the conductor pressing protrusion 37 configured to be fitted in the conductor molding groove 35 defined by the stationary electrode 13 and the wire holding jig 17. The movable electrode 19 has a ring-shaped molding surface 47 at the lower surface of the conductor pressing protrusion 37. The contacting and pressing surface 49 is provided to extend contiguously from the ring-shaped molding surface 47 and to conform to the shape of the overlap portion 51 of the looped conductor 25. The contacting and pressing surface 49 is formed as a slanting surface gradually separating from the looped conductor 25 as it extends toward the coated wire portion 33.

The movable electrode 19 is configured to press, when a load is applied by a pressing machine (not shown), the looped conductor 25 placed in the conductor molding groove 35. Through the movable electrode 19 and the stationary electrode 13, a current is applied from the power supply. The current applied to the movable electrode 19 and the stationary electrode 13 causes Joule heat by the resistance of the conductor itself or the resistance of the contact portion. The mold 11 according to the present exemplary embodiment is configured to melt the looped conductor 25 by using the heat and pressure of this resistance welding to mold the ring terminal portion 39.

Figure 4:
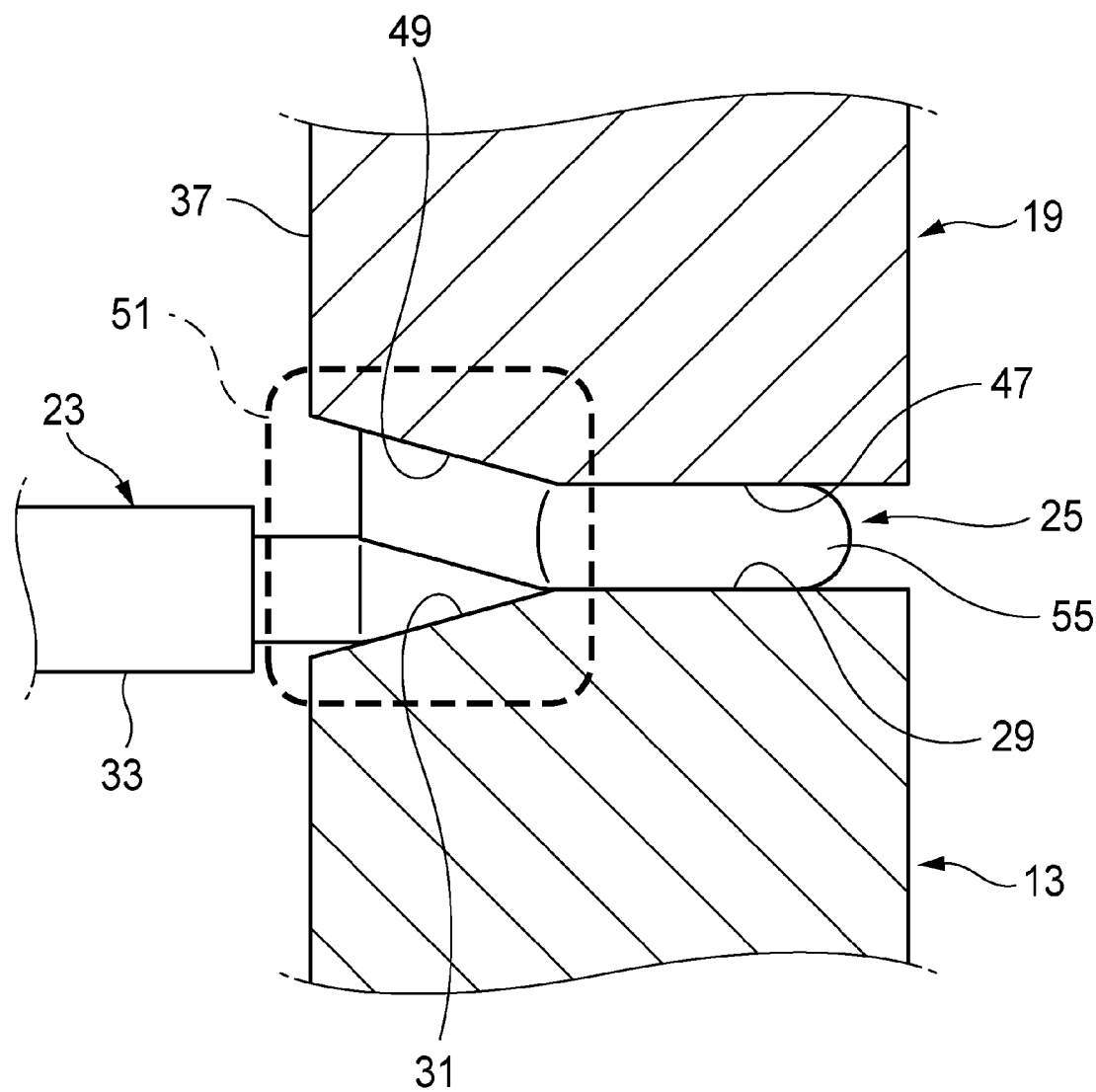
FIG. 4 is a cross-sectional view of a first electrode and a second electrode having a contacting and pressing surface.

In the present exemplary embodiment, as shown in FIG. 4, the contacting and pressing surfaces configured to conform to shape of the overlap portion 51 of the looped conductor 25 are provided on both of the movable electrode 19 and the stationary electrode 13 as the contacting and pressing surface 49 and the contacting and pressing surface 31. However, the contacting and pressing surface may not be provided on both of the movable electrode 19 and the stationary electrode 13, and may be provided on at least one of the stationary electrode 13 and the movable electrode 19 to conform to shape of the overlap portion 51 at which the distal end part and base part of the looped conductor 25 are arranged on top of one another in an overlapping manner.

Next, a method of manufacturing a terminal-formed electric wire 53 using the mold 11 will be described.

The mold 11 according to the present exemplary embodiment is used, together with a pressing machine and a power supply, as one component of a manufacturing apparatus (not shown) for the terminal-formed electric wire 53. The manufacturing apparatus for the terminal-formed electric wire 53 may be provided by applying a resistance welder.

The first holding jig 43 and the second holding jig 45 of the mold 11 are detachable attached to predetermined positions of the base. As shown in FIG. 1, the first holding jig 43 and the second holding jig 45 are arranged to surround the stationary electrode 13 that is fixed to the base to define the conductor molding groove 35 (see FIG. 6).

The exposed conductor 55 of the electric wire 23, from which the coating 21 is removed, is bent in a ring shape to form the looped conductor 25, and is placed in this conductor molding groove 35. The looped conductor 25 has the overlap portion 51 at which the distal end part of the exposed conductor 55 is placed on top of the base part of the conductor 55. Therefore, the cross-sectional area of the looped conductor 25 is increased at the base portion of the looped conductor 25.

Figure 5:
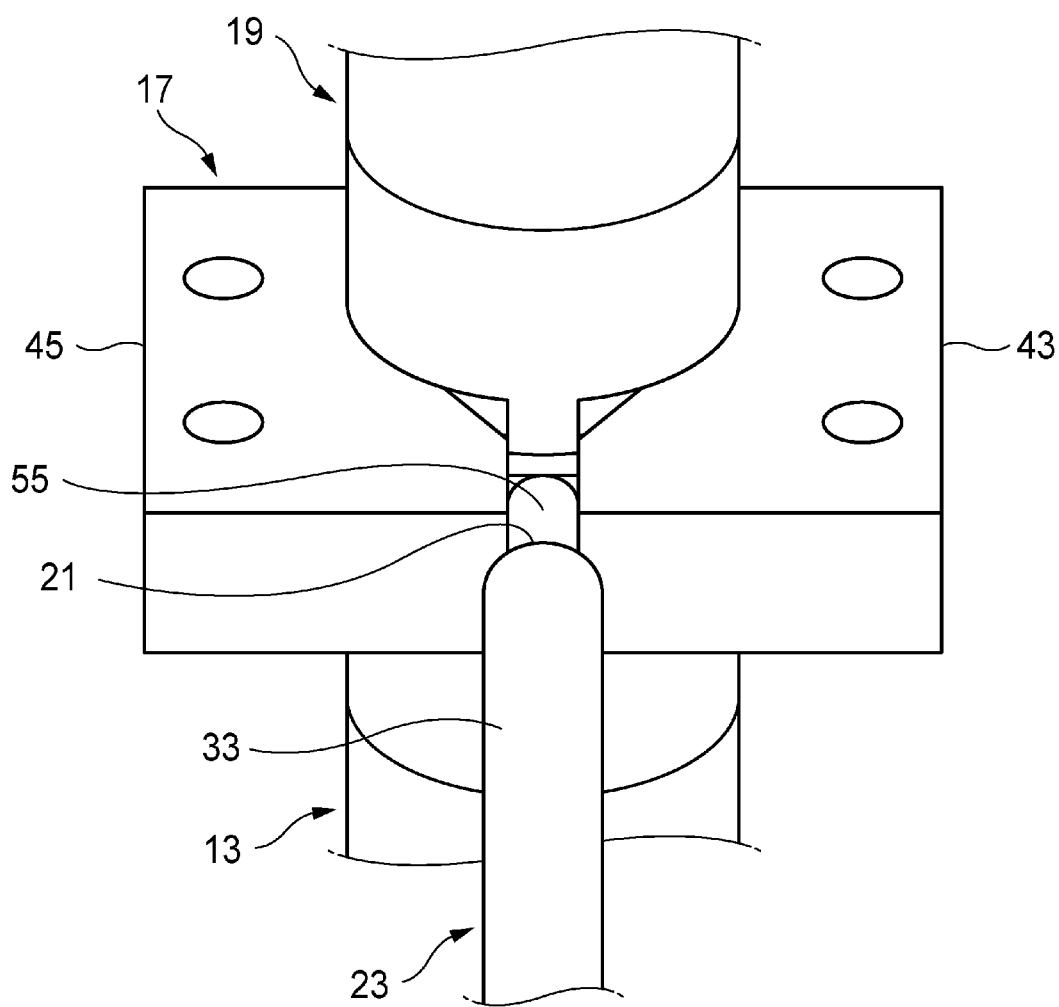
FIG. 5 is a perspective view of the mold, illustrating a state during resistance welding.

Then, in the melting process, as shown in FIG. 5, the conductor pressing protrusion 37 of the movable electrode 19 is fitted in the conductor molding groove 35, and the conductor 55 in the conductor molding groove 35 is pressed by the conductor pressing protrusion 37 and is applied with current so that it is heat-melted. The looped conductor 25, including its round portion around the hole forming jig 15 and its base portion, is melted by the resistance welding. The stationary electrode 13 and the movable electrode 19 are provided with the contacting and pressing surface 31 and the contacting and pressing surface 49 that are configured to gradually separate from the looped conductor 25 as they extend toward the coated wire portion 33. The stationary electrode 13 and the movable electrode 19 form a terminal base portion 57 having a cross-sectional area that increases gradually toward the coated wire portion 33, between the ring terminal portion 39 and the conductor 55 on the side of the non-molded coated wire portion 33 (see FIG. 1).

The looped conductor 25 may be preformed before being melted so as to adjust to the shape of electric wire in advance.

Figure 6:
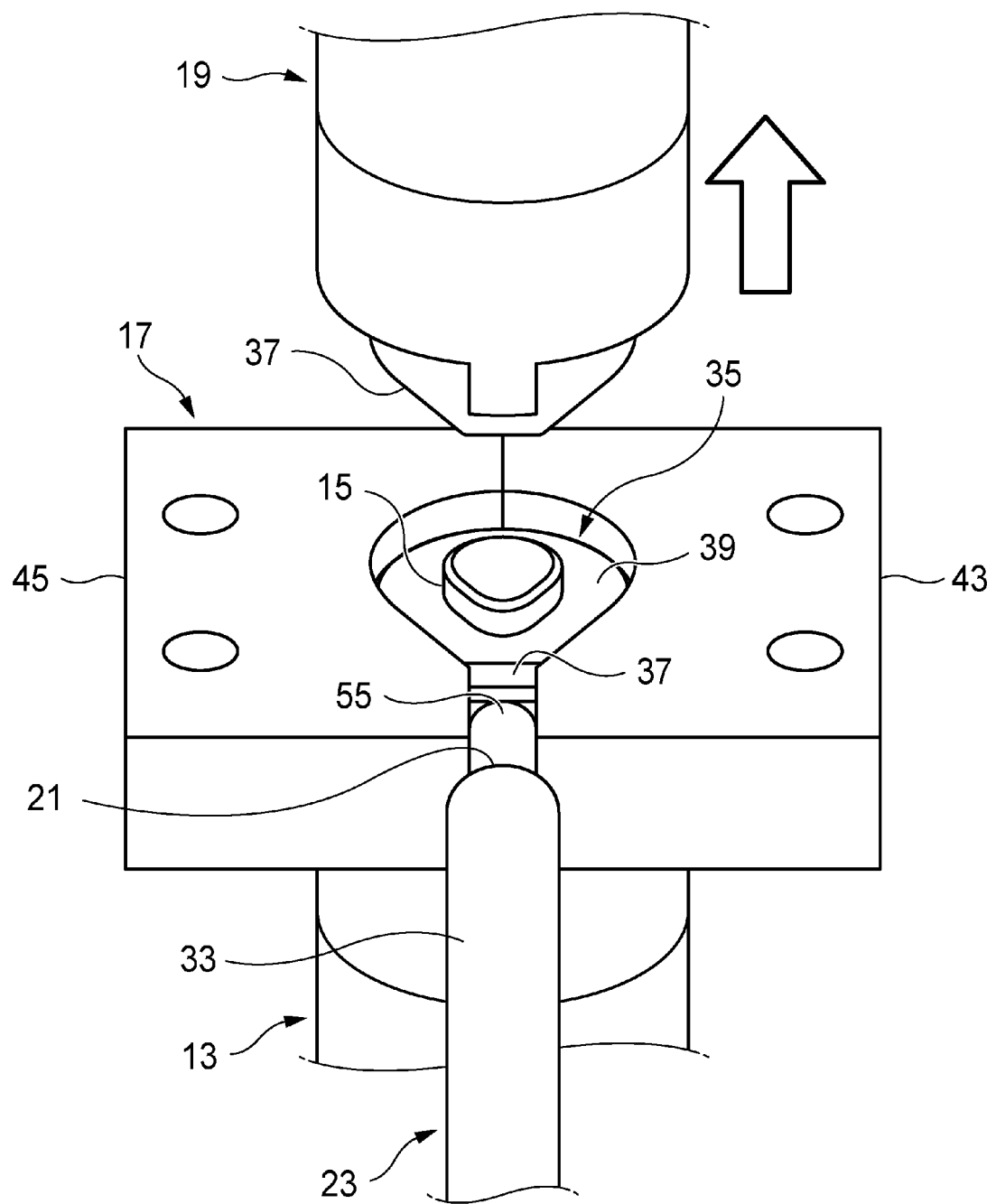
FIG. 6 is a perspective view of the mold, illustrating a state in which the second electrode is moved up.
Figure 7:
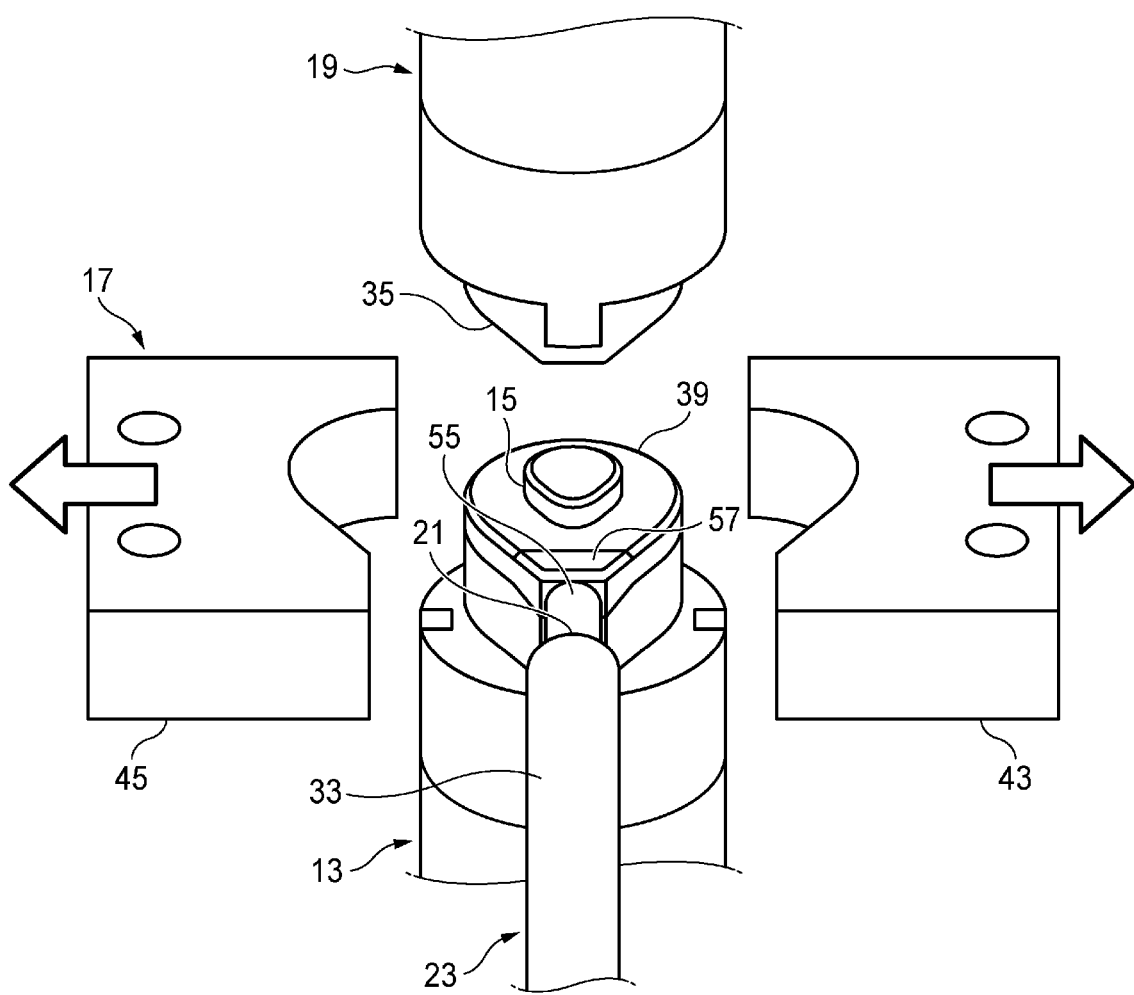
FIG. 7 is a perspective view of the mold, illustrating a state in which the electric wire is to be removed.
Figure 8A:
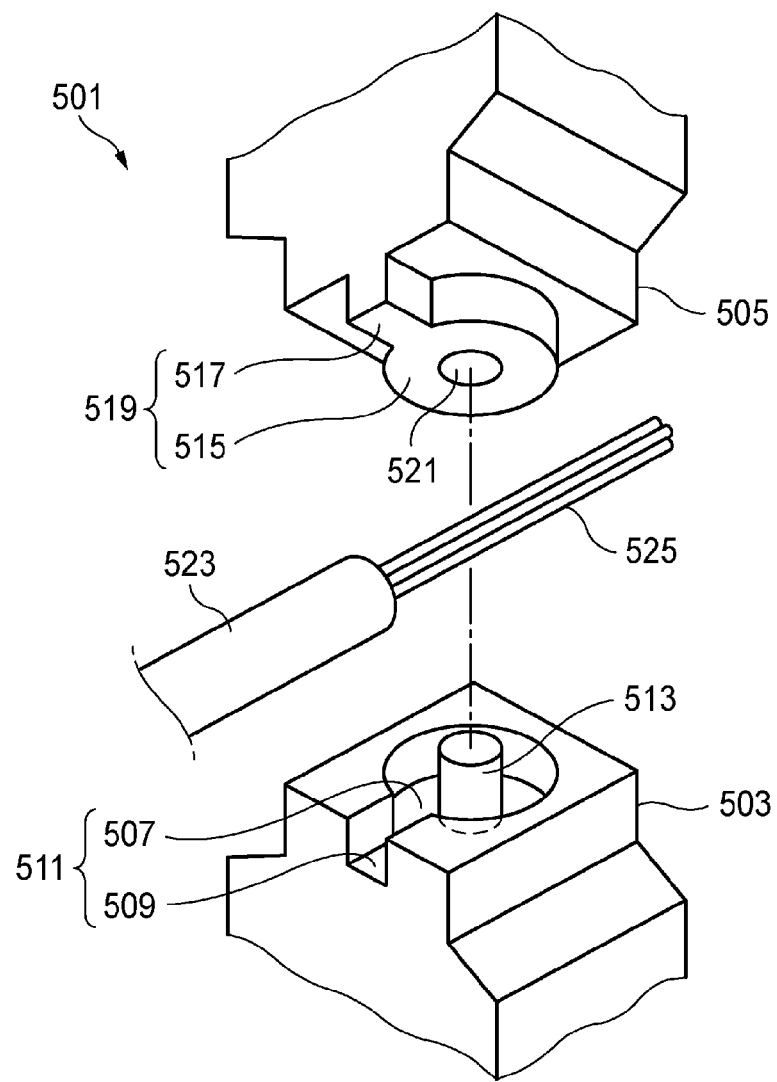
FIG. 8A is a perspective view of a pair of molding electrodes according to a related art.
Figure 8B:
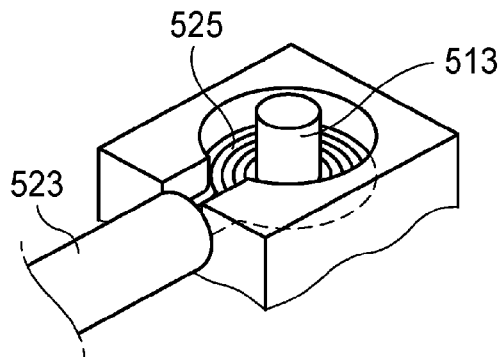
FIG. 8B is a perspective view of one of the related art electrodes in which an electric wire is set.
Figure 8C:
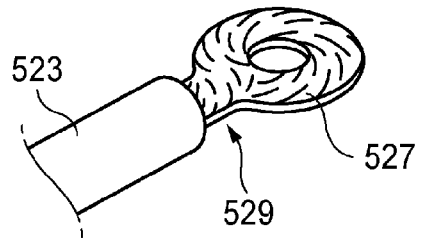
FIG. 8C is a perspective view of the electrode wire with its terminal portion formed in a ring-shape.

When the application of the current finished, the movable electrode 19 is moved up as shown in FIG. 6, whereby the upper part of the cavity 41 is opened. Then, the first holding jig 43 and the second holding jig 45 are opened in the horizontal direction, whereby the lateral sides of the cavity 41 are opened, allowing the terminal-formed electric wire 53 to be easily removed.

The terminal-formed electric wire 53 molded by the mold 11 has the coated wire portion 33, the conductor 55 and the ring terminal portion 39.

The coated wire portion 33 is a portion of the electric wire 23 where the conductor 55 is covered with the insulative coating 21. The ring terminal portion 39 is molded at at least on one side of the coated wire portion 33 by pressing and heating the conductor 55.

The conductor 55 may be a single wire or a stranded wire formed by stranding a plurality of wires. Examples of the material of the conductor 55 include an aluminum alloy and a copper alloy. In the present exemplary embodiment, the coating 21 is removed at the terminal of the electric wire 23 so that the conductor 55 of the stranded wire made of aluminum or aluminum alloy is exposed. In other examples, the exposed conductor 55 where the ring terminal portion 39 is to be formed may be an intermediate portion of the electric wire 23 from which the coating 21 is removed. In this case, the exposed conductor 55 is bent is a ring shape and placed in the conductor molding groove 35 such that the coated wire portions 33 on both sides are arranged to extend together in the same direction.

The ring terminal portion 39 is molded by pressing and heating the exposed conductor 55 in a manner described above, the conductor 55 being exposed by removing the coating 21 and having a circular cross section. That is, the ring terminal portion 39 is formed by bending the exposed conductor 55 to form a circular loop. When forming the loop, the distal end part of the conductor 55 is placed on top of the base part of the conductor 55. This makes the volume of the base part (the part closer to the coating 21) of the ring terminal portion 39 twice as that of the other part of the rind terminal portion 39. The conductor 55 that has been bent in a looped manner is pressed and heated in a state of being sandwiched between the conductor molding groove 35 and the conductor pressing protrusion 37. The conductor 55 is melted and then solidified, and is molded as the ring terminal portion 39 shown in FIG. 1.

The ring terminal portion 39 is, as shown in FIG. 1, formed as a flat ring terminal having a bolt through hole 59, originally the inner hole 27, at the center. The part between the ring terminal portion 39 and the non-molded conductor 55 formed as the terminal base portion 57. The terminal base portion 57 has a cross-sectional area that is approximately twice as that of the other part of the ring terminal portion 39, because it is the portion where the distal end part and the base part of the exposed conductor 55 are arranged to overlap each other as described above. This terminal base portion 57 is formed substantially in a truncated quadrangular pyramid having a taper by the contacting and pressing surface 49 and the contacting and pressing surface 31. This taper is oriented such that the cross-sectional area gradually increases from the ring portion of the ring terminal portion 39 toward the non-molded conductor 55. The terminal base portion 57 provides higher strength between the ring terminal portion 39 and the coated wire portion 33 than other portions of the terminal-formed electric wire 53. Accordingly, the terminal-formed electric wire 53 does not easily break at the terminal base portion 57 even when the coated wire portion 33 is tensioned in a state in which the terminal-formed electric wire 53 is fastened by a bolt through the bolt through hole 59.

The terminal-formed electric wire 53 form a part of a connector by a housing molding process as a post-process in which the adjoining parts of the ring terminal portion 39 and the coating 21 of the coated wire portion 33 are integrally covered with a housing molded of an insulating resin. In this case, only the inner periphery of the bolt through hole 59 of the terminal-formed electric wire 53 may be exposed to the outside of the housing.

According to the mold 11 described above, after the looped conductor 25 is molded, first, the movable electrode 19 is moved up from the conductor molding groove 35, and the cavity 41 is opened. Then, the first holding jig 43 and the second holding jig 45 are moved away from each other in the horizontal direction, whereby both sides of the cavity 41 are opened. This make it easy to take out the terminal-formed electric wire 53 from the mold 11, and prevents a breakage of the terminal-formed electric wire 53 that may occur due to a forcible removal.

Moreover, according to the mold 11 described above, the looped conductor 25 of the electric wire 23 is placed on the stationary electrode 13, the looped conductor 25 being the exposed conductor 55 of the electric wire 23 from which the coating 21 is removed and having the overlap portion 51 at which the distal end part of the exposed conductor 55 is placed on top of the base part of the exposed conductor 55. The hole forming jig 15 of the stationary electrode 13 is passed through the inner hole 27 of the looped conductor 25. The wire holding jig 17 is arranged to surround the stationary electrode 13 to define the conductor molding groove 35 together with the stationary electrode 13 provided at a lower side.

In the open side of the conductor molding groove 35, the conductor pressing protrusion 37 of the movable electrode 19 is fitted from above. Regarding the movable electrode 19, the conductor pressing protrusion 37 is fitted with a predetermined pressure, and a voltage is applied between the movable electrode 19 and the stationary electrode 13. Therefore, the looped conductor 25 disposed in the conductor molding groove 35 is melted by the Joule heat inside the cavity 41 surrounded by the conductor molding groove 35 and the conductor pressing protrusion 37, and then, is molded by being solidified to conform to the inner shape of the cavity 41.

At the time of molding, the overlap portion 51 of the looped conductor 25 a bulky shape than the other portion of the loop conductor 29. The contacting and pressing surface 31 and the contacting and pressing surface 49 are formed to conform to the bulky shape of the overlap portion 51 of the looped conductor 25. Accordingly, the contacting and pressing surface 31 and the contacting and pressing surface 49 can be in uniform contact with the surface of the overlap portion 51. For example, by the contacting and pressing surface 49 of the movable electrode 19 being in uniform contact with the overlap portion 51, variation in the Joule heat generated the looped conductor 25 is suppressed. That is, unevenness in melting and a shrinkage defect do not occur in the looped conductor 25. As a result, the looped conductor 25 can be molded to conform to the inner shape of the cavity 41 in a favorable manner.

As described above, with the mold 11 of the present exemplary embodiment, the ring terminal portion 39 is molded in a shape conforming to the cavity 41 surrounded by the conductor molding groove 35 and the conductor pressing protrusion 37. The distal end part of the conductor 55 is placed on top of the base part of the conductor 55 extending from the coating 21, whereby the cross-sectional area of the base portion (corresponding to the overlap portion 51) the ring terminal portion 39 is increased. Thus, the terminal-formed electric wire 53 has the ring terminal portion 39 with the strength being high at the terminal base portion 57. Accordingly, the contacting and pressing surface 49 and the contacting and pressing surface 31 have an advantage in that the ring terminal portion 39 is molded to have high strength.

Moreover, in the mold 11 of the present exemplary embodiment, since the contacting and pressing surface 49 and the contacting and pressing surface 31 are provided on both of the stationary electrode 13 and the movable electrode 19, the center of the overlap portion 51 in the thickness direction (overlapping direction) coincides with the center, in the thickness direction, of the ring terminal portion 39 where the bolt through hole 59 is formed. This provides a favorable appearance of the terminal base portion 57 after the molding.

Therefore, according to the mold 11 of the present exemplary embodiment, the ring terminal portion 39 can be excellently molded by pressing and heating the looped conductor 25.

Following are some aspects of a mold according to one or more exemplary embodiments of the present invention.

A mold (11) is provided to form a terminal of an electric wire (23). The mold (11) includes a first electrode (e.g., the stationary electrode 13) on which a looped conductor (25) of the electric wire (23) is placed, the looped conductor (25) being an exposed conductor (55) of the electric wire (23) from which a coating (21) of the electric wire (23) is removed and having an overlap portion (51) at which different parts of the exposed conductor (55) are placed to overlap each other, a hole forming jig (15) provided upright on the first electrode to extend through an inner hole (27) of the looped conductor (25) placed on the first electrode, a wire holding jig (17) arranged to surround the first electrode, and a second electrode (e.g., the movable electrode (19) having a conductor pressing protrusion (37) configured to be fitted in a conductor molding groove (35) defined by the first electrode and the wire holding jig (17) to press and heat the looped conductor (25) between the first electrode and the second electrode. The wire holding jig (17) has a plurality of separable holding jigs (43, 45) configured to hold the looped conductor (25) of the electric wire (23) and the hole forming jig (15) between the separable holding jigs (43, 45) from a direction perpendicular to an axis of the hole forming jig (15).

At least one of the first electrode and the second electrode may have a contacting and pressing surface (31, 49) configured to conform to a shape of the overlap portion (51) of the looped conductor (25).

Each of the first electrode and the second electrode may have the contacting and pressing surface (31, 49).

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

What is claimed is:

1. A mold for forming a terminal of an electric wire, the mold comprising:
   a first electrode on which a looped conductor of the electric wire is placed, the looped conductor being an exposed conductor of the electric wire from which a coating of the electric wire is removed and having an overlap portion at which different parts of the exposed conductor are placed to overlap each other;
   a hole forming jig provided upright on the first electrode to extend through an inner hole of the looped conductor placed on the first electrode;
   a wire holding jig arranged to surround the first electrode; and
   a second electrode comprising a conductor pressing protrusion configured to be fitted in a conductor molding groove defined by the first electrode and the wire holding jig to press and heat the looped conductor between the first electrode and the second electrode,
   wherein the wire holding jig has a plurality of separable holding jigs configured to hold the looped conductor of the electric wire and the hole forming jig between the separable holding jigs from a direction perpendicular to an axis of the hole forming jig.

2. The mold according to claim 1, wherein at least one of the first electrode and the second electrode comprises a contacting and pressing surface configured to conform to a shape of the overlap portion of the looped conductor.

3. The mold according to claim 2, wherein each of the first electrode and the second electrode comprises the contacting and pressing surface.

* * * * *